(12) United States Patent
Murakami et al.

(10) Patent No.: US 10,018,468 B2
(45) Date of Patent: Jul. 10, 2018

(54) PHYSICAL-QUANTITY DETECTION CIRCUIT, PHYSICAL-QUANTITY SENSOR, AND ELECTRONIC DEVICE

(71) Applicant: Panasonic Intellectual Property Management Co., Ltd., Osaka (JP)

(72) Inventors: Hideyuki Murakami, Osaka (JP); Takashi Kawai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 204 days.

(21) Appl. No.: 14/911,253

(22) PCT Filed: Oct. 23, 2014

(86) PCT No.: PCT/JP2014/005378
§ 371 (c)(1),
(2) Date: Feb. 9, 2016

(87) PCT Pub. No.: WO2015/072090
PCT Pub. Date: May 21, 2015

(65) Prior Publication Data
US 2016/0187136 A1    Jun. 30, 2016

(30) Foreign Application Priority Data

Nov. 14, 2013  (JP) .................................. 2013-235668

(51) Int. Cl.
*G01C 19/5614*    (2012.01)
*G01C 19/5776*    (2012.01)
*G01P 15/097*    (2006.01)

(52) U.S. Cl.
CPC ..... *G01C 19/5614* (2013.01); *G01C 19/5776* (2013.01); *G01P 15/097* (2013.01)

(58) Field of Classification Search
CPC .......................... G01C 19/5614; G01C 19/5776
See application file for complete search history.

(56) References Cited

U.S. PATENT DOCUMENTS

2010/0289480 A1    11/2010  Soramoto et al.
2012/0191398 A1*    7/2012  Murakami ......... G01C 19/5776
                                    702/99

FOREIGN PATENT DOCUMENTS

| JP | 9-033258 | 2/1997 |
| JP | 10-038580 | 2/1998 |
| JP | 2728300 B | 3/1998 |
| JP | 2002-031532 | 1/2002 |
| JP | 2008-224230 | 9/2008 |
| JP | 2009-281888 | 12/2009 |
| JP | 2010-181239 | 8/2010 |
| JP | 2011-137777 | 7/2011 |
| JP | 2012-189610 | 10/2012 |

OTHER PUBLICATIONS

International Search Report of PCT application No. PCT/JP2014/005378 dated Dec. 16, 2014.

* cited by examiner

*Primary Examiner* — John Chapman, Jr.
(74) *Attorney, Agent, or Firm* — McDermott Will & Emery LLP

(57) ABSTRACT

A physical-quantity sensor is configured to be used with a physical-quantity sensor element that outputs a sensor signal in response to a physical quantity. A physical-quantity detection circuit of the physical-quantity sensor includes a signal generating unit for generating a detecting signal and a multiplier that multiplies the sensor signal by the detecting signal. The signal generating unit converts a first phase of a predetermined signal having a frequency corresponding to a frequency of the sensor signal, into a second phase, and calculates an amplitude value corresponding to the second phase as to generate the detecting signal. This physical-quantity sensor improves accuracy of phase adjustment without increasing a sampling frequency.

5 Claims, 13 Drawing Sheets

PHYSICAL-QUANTITY DETECTION CIRCUIT, PHYSICAL-QUANTITY SENSOR, AND ELECTRONIC DEVICE

CROSS-REFERENCE TO RELATED APPLICATIONS

This application is a U.S. national stage application of the PCT International Application No. PCT/JP2014/005378 filed on Oct. 23, 2014, which claims the benefit of foreign priority of Japanese patent application 2013-235668 filed on Nov. 14, 2013, the contents all of which are incorporated herein by reference.

TECHNICAL FIELD

The present invention relates to a physical-quantity detection circuit to be used in a physical-quantity sensor that senses a physical quantity applied from outside, to the physical-quantity sensor including the physical-quantity detection circuit, and an electronic device including the physical-quantity detection circuit.

BACKGROUND ART

A physical-quantity sensor capable of detecting a physical quantity, such as an angular velocity and an acceleration, has been used in a variety of technical fields such as detection of a camera shake of a digital camera, attitude control of a movable unit, such as airplanes, automobiles, robots, and vessels, missile guidance, and spacecraft guidance.

In general, the physical-quantity sensor includes a physical-quantity sensor element that outputs a sensor signal in response to a physical quantity applied from outside, and a physical-quantity detection circuit that uses a detecting signal for extracting a physical quantity signal from the sensor signal. This physical-quantity sensor may produce an unexpected phase-shift between the sensor signal and the detecting signal due to variations in its manufacturing processes (e.g. diffusion dispersions in resistors or capacitors) or environmental changes (e.g. change in temperature). It is thus required that the phase relation between the sensor signal and the detecting signal be adjusted so as to synchronize the sensor signal to the detecting signal.

In recent years, micro-processing techniques in circuits have been developed, whereby digitization is progressing in the physical-quantity detection circuits. Japanese Patent No. 2728300 (PTL 1) discloses a signal processing circuit for biaxial angular velocity sensor. This circuit is implemented by a digital circuit in which an analog-digital conversion circuit converts a sensor signal supplied from a sensor into a digital sensor signal, a sinewave signal generation circuit for generating a digital sinewave signal, and a digital multiplier for multiplying the digital sensor signal by the digital sinewave signal.

FIG. 13 illustrates a process of the analog-digital conversion circuit in the physical-quantity sensor. The analog-digital conversion circuit samples a sensor signal every sampling period while being synchronized to a sampling clock, and converts analog values (amplitude values) A0, A1, A2, . . . of the sampled sensor signals into digital values P0, P1, P2, . . . .

CITATION LIST

Patent Literature

PTL 1: Japanese Patent No. 2728300

SUMMARY

A physical-quantity sensor is configured to be used with a physical-quantity sensor element that outputs a sensor signal in response to a physical quantity. A physical-quantity detection circuit used in physical-quantity sensor includes a signal generating unit for generating a detecting signal and a multiplier for multiplying the sensor signal by the detecting signal. The signal generating unit converts a first phase of a predetermined signal having a frequency corresponding to a frequency of the sensor signal, into a second phase, and calculates an amplitude value corresponding to the second phase as to generate the detecting signal. This physical-quantity sensor improves accuracy of phase adjustment without increasing a sampling frequency.

DETAIL DESCRIPTION OF PREFERRED EMBODIMENT

Figure 1:
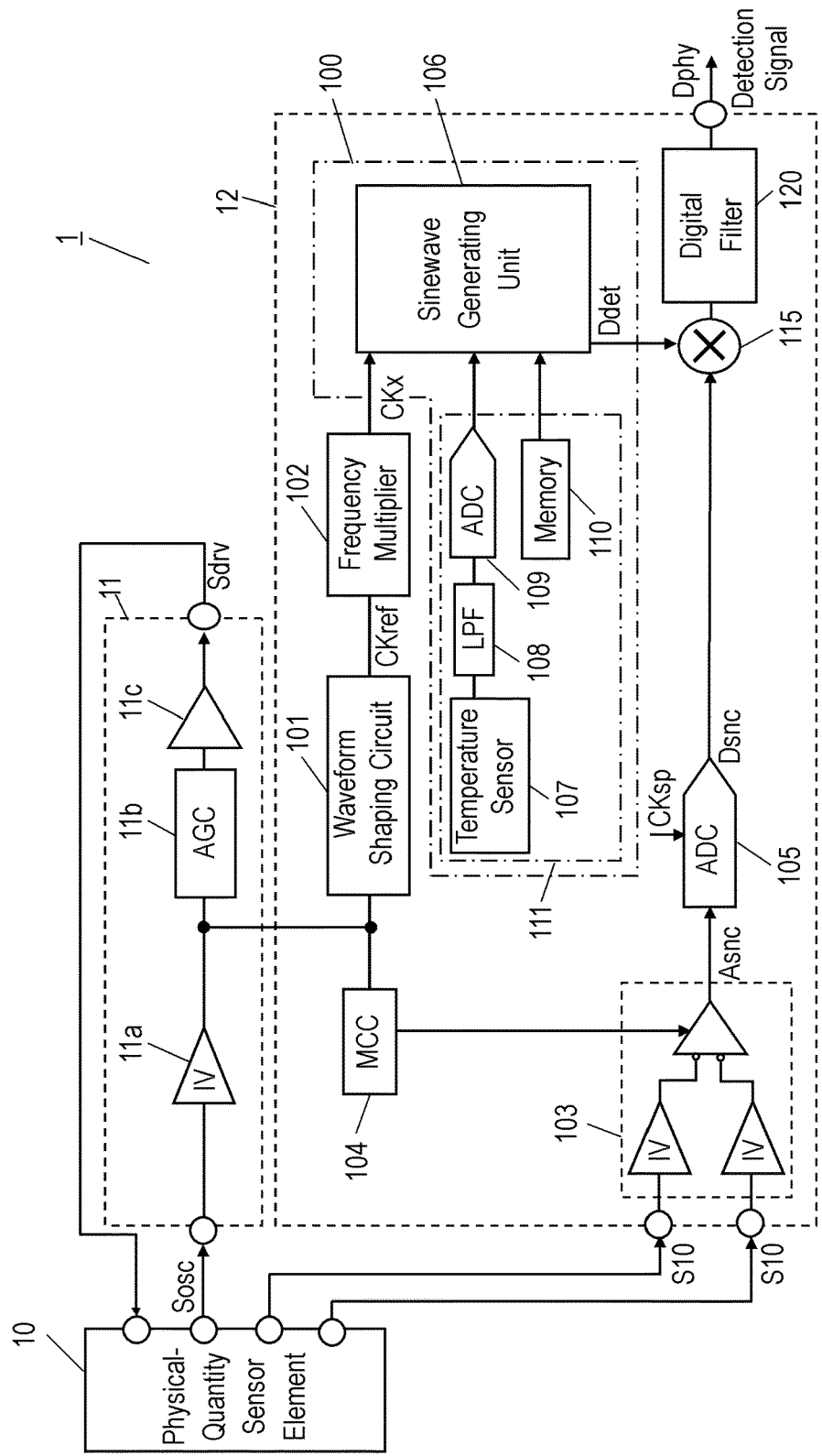
FIG. 1 is a block diagram of a physical-quantity sensor in accordance with an exemplary embodiment.

FIG. 1 is a block diagram of physical-quantity sensor 1 in accordance with an exemplary embodiment. Sensor 1 includes physical-quantity sensor element 10, drive circuit 11, and physical-quantity detection circuit 12.

Sensor element 10 receives drive signal Sdrv having a predetermined frequency and supplied from drive circuit 11, thereby vibrating while outputting sensor signal S10 in response to a physical quantity (e.g. angular velocity, acceleration) applied from outside. Sensor signal S10 has a frequency corresponding to a frequency of drive signal Sdrv. For instance, a center frequency of sensor signal S10 corresponds to the frequency of drive signal Sdrv. According to this embodiment, physical-quantity sensor element 10 is a tuning-fork angular velocity sensor. Drive circuit 11 supplies drive signal Sdrv to sensor element 10 for vibrating sensor element 10. Sensor element 10 outputs oscillating signal Sosc in response to the vibration. Drive circuit 11 adjusts a frequency and an amplitude of drive signal Sdrv in response to oscillating signal Sosc supplied from sensor element 10. Physical-quantity detection circuit 12 detects a physical quantity based on sensor signal S10 supplied from sensor element 10.

Drive circuit 11 will be detailed below.

Figure 2:
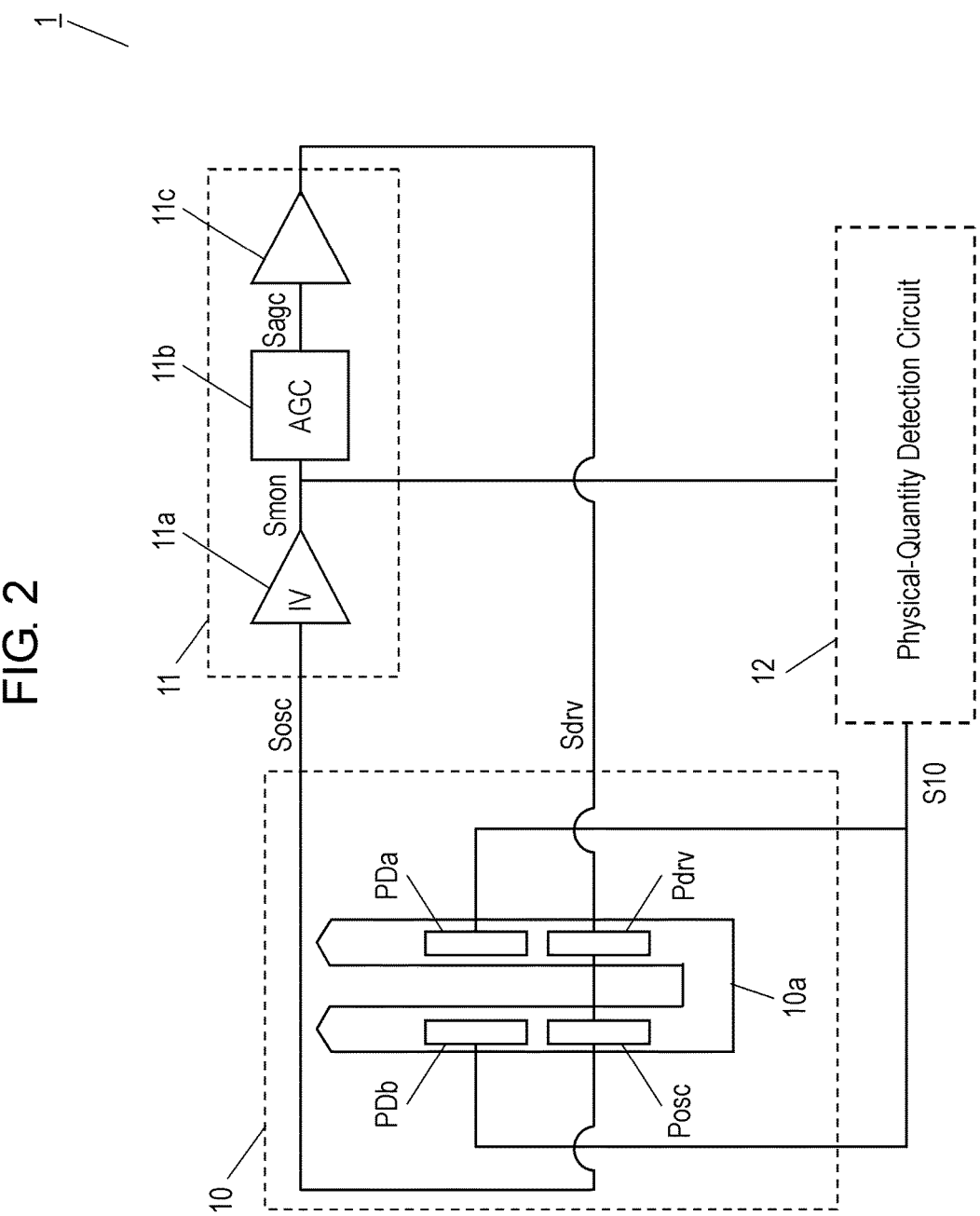
FIG. 2 is a block diagram of a physical-quantity sensor element and a drive circuit of the physical-quantity sensor in accordance with the embodiment.

FIG. 2 is a block diagram of physical-quantity sensor element 10 and drive circuit 11. Sensor element 10 includes tuning-fork body 10*a*, piezoelectric driver Pdrv, piezoelectric vibration detector Posc, and piezoelectric angular-velocity detectors PDa and PDb. Piezoelectric driver Pdrv, piezoelectric vibration detector Posc, and piezoelectric angular-velocity detectors PDa and PDb are provided on tuning-fork body 10*a*. Piezoelectric driver Pdrv vibrates tuning-fork body 10*a* in response to the frequency and the amplitude of drive signal Sdrv. This vibration causes piezoelectric vibration detector Posc to generate electric charges, thereby generating oscillating signal Sosc. When an angular velocity of a rotation is applied to tuning-fork body 10*a* while tuning-fork body 10*a* vibrates, tuning-fork body 10*a* warps in response to a Coriolis force produced due to the angular velocity of the rotation. The warp in response to the Coriolis force caused by the angular velocity of the rotation generates electric charges on piezoelectric angular-velocity detectors PDa and PDb, thereby generating sensor signal S10.

As shown in FIGS. 1 and 2, drive circuit 11 includes monitor amplifier 11*a*, automatic gain control amplifier (AGC) 11*b*, and drive amplifier 11*c*. Monitor amplifier 11*a* converts electric charges (electric current), namely, oscillating signal Sosc supplied from physical-quantity sensor element 10 into a voltage, and sends the voltage as signal Smon to AGC 11*b*. AGC 11*b* amplifies signal Smon and sends the amplified voltage as signal Sagc to drive amplifier 11*c*. AGC 11*b* changes a gain at which signal Smon is amplified such that a voltage of signal Sagc sent to driver amplifier 11*c* can be constant. Drive amplifier 11*c* controls a frequency and an amplitude of drive signal Sdrv in response to signal Sagc supplied from AGC 11*b*. As discussed above, drive signal Sdrv is adjusted in response to oscillating signal Sosc to cause the maximum oscillation amplitude and an oscillation frequency of physical-quantity sensor element 10 to be constant.

Physical-quantity detection circuit 12 will be detailed below. As shown in FIG. 1, detection circuit 12 includes waveform shaping circuit 101, frequency multiplier 102, signal generating unit 100, input amplifier 103, analog-digital converter (ADC) 105, multiplier 115, and digital filter 120.

Waveform shaping circuit 101 converts oscillating signal Sosc into a square wave, and outputs the square wave as reference clock CKref. For instance, waveform shaping circuit 101 can be implemented by a comparator and an inverter. The frequency of reference clock CKref is substantially identical to the frequency of drive signal Sdrv, namely, the frequency of sensor signal S10.

Frequency multiplier 102 multiplies reference clock signal CKref supplied from waveform shaping circuit 101, thereby generating multiplied clock CKx having a frequency higher than that of reference clock signal CKref. Frequency multiplier 102 is implemented by, e.g. a phase locked loop (PLL).

Input amplifier 103 converts sensor signal S10 supplied from physical-quantity sensor element 10 into a voltage, and outputs the voltage as analog sensor signal Asnc. Sensor signal S10 contains a certain undesired signal. For instance, in physical-quantity sensor element 10, the direction of the vibration caused by drive signal Sdrv is perpendicular to the direction of the bending in response to the applied physical quantity (e.g. angular velocity) to be detected. The vibration and the warping ideally do not interfere with each other. However, in reality, the driven vibration interferes with the warping produced in response to the physical quantity due to an error in processes for manufacturing physical-quantity sensor element 10, thus allowing the unnecessary signals unnecessary for detecting the physical quantity are mixed with sensor signal S10. Mechanical coupling cancel (MCC) unit 104 adds, to analog sensor signal Asnc, a mechanical coupling (MC) signal formed by adjusting the phase of drive signal Sdrv, thereby cancelling at least a part of the unnecessary signal contained in signal Asnc for reducing the unnecessary signal.

Analog-digital converter 105 samples analog sensor signal Asnc while being synchronized with sampling clock CKsp, and converts the sampled amplitude value (analog value) into a digital value. This operation allows analog sensor signal Asnc to be converted into digital sensor signal Dsnc formed of multiple digital values. An amplitude of the unnecessary signal contained in sensor signal S10 may be extremely larger than an amplitude of a signal corresponding to the physical quantity to be detected. In this case, the unnecessary signal contained in analog sensor signal Asnc input to analog-digital converter 105 is cancelled to widen a dynamic range of converter 105 with respect to the signal corresponding to the physical quantity, thereby detecting the physical quantity more accurately.

Signal generating unit 100 includes sinewave generating unit 106, temperature sensor 107, low-pass filter (LPF) 108, analog-digital converter (ADC) 109, and memory 110.

Temperature sensor 107 senses a temperature, and outputs temperature data corresponding to the sensed temperature. The temperature data passes through LPF 108, and then, is converted into a digital value by converter 109. The temperature data converted into the digital signal is input to sinewave generating unit 106 every predetermined period. Memory 110 stores a correction amount corresponding to the temperature data. Temperature sensor 107, LPF 108, analog-digital converter 109, and memory 110 constitute correction-amount generator 111.

Figure 3:
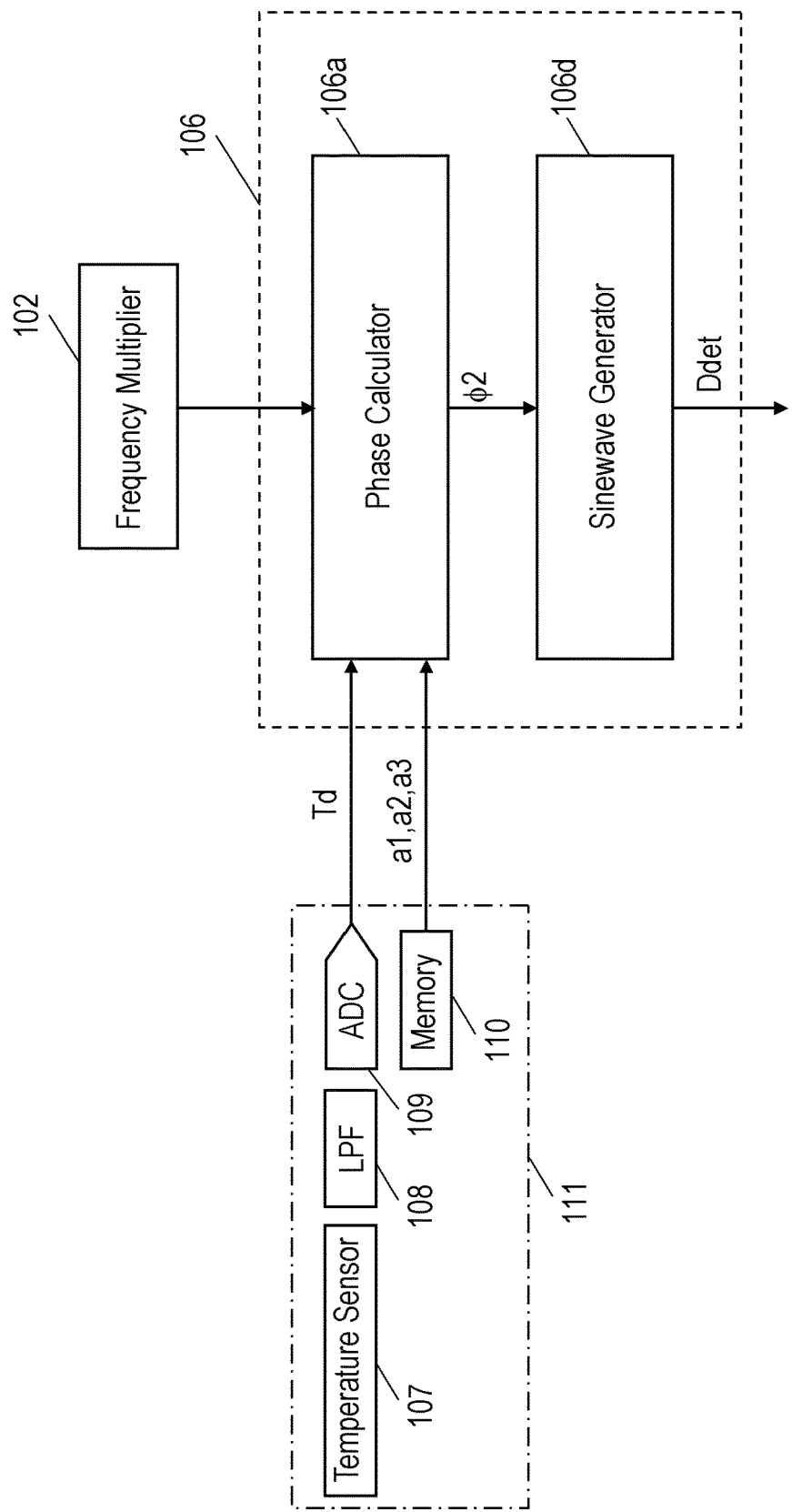
FIG. 3 is a block diagram of a sinewave generating unit of the physical-quantity sensor in accordance with the embodiment.

FIG. 3 is a block diagram of sinewave generating unit 106.

Sinewave generating unit 106 includes phase calculator 106*a* and sinewave generator 106*d*, and is connected to correction-amount generator 111.

Phase calculator 106*a* calculates phase φ1 based on frequency-multiplied clock CKx obtained from frequency multiplier 102, and obtains correction coefficients a1, a2, and a3 corresponding to temperature data Td supplied from temperature sensor 107 for calculating phase φ2 converted from phase φ1 based on correction coefficients a1, a2, and a3. According to this embodiment, phase calculator 106*a* calculates correction amount Ad and phase φ2 by using equations (1) defined by phase φ1, temperature data Td, correction coefficients a1, a2, and a3:

$$Ad = a1 \times Td^2 + a2 \times Td + a3$$

$$\phi 2 = \phi 1 + Ad \qquad (1).$$

Sinewave generator 106*d* calculates an amplitude value corresponding to input phase φ2, thereby generating detecting signal Ddet that forms a sinewave. A calculation method for providing a phase for generating the sinewave can employ, e.g., a CORDIC computation.

As discussed above, signal generating unit 100 converts phase φ1 of a predetermined signal having a frequency corresponding to the frequency of sensor signal S10, into phase φ2, and then, calculates the amplitude value corresponding to phase φ2 as to generate detecting signal Ddet. According to this embodiment, the predetermined signal is oscillating signal Sosc.

Figure 4:
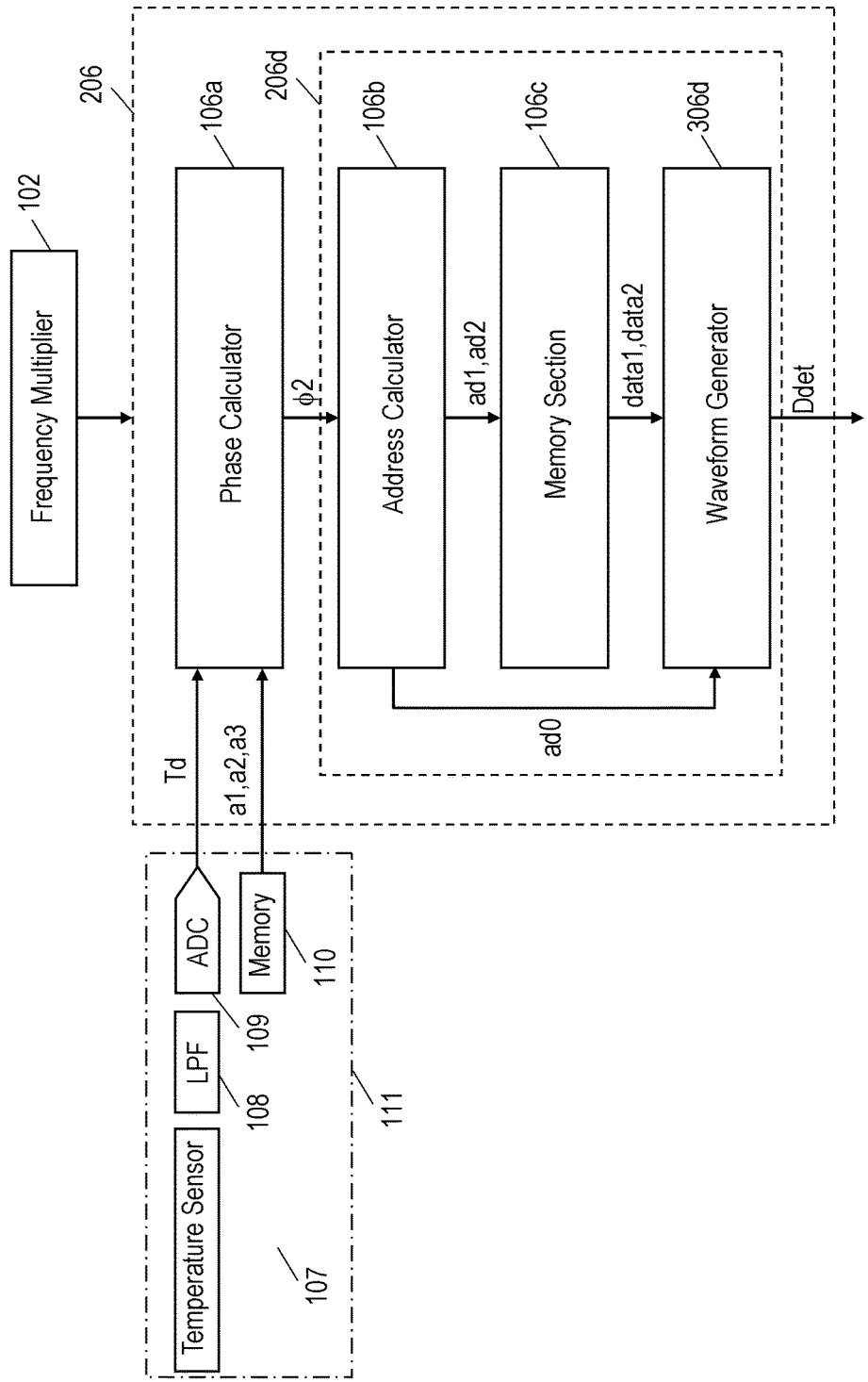
FIG. 4 is a block diagram of another sinewave generating unit of the physical-quantity sensor in accordance with the embodiment.

FIG. 4 is a block diagram of another sinewave generating unit 206 in accordance with the embodiment. In FIG. 4, components identical to those of sinewave generating unit 106 shown in FIG. 3 are denoted by the same reference numerals. Sinewave generating unit 206 includes sinewave generator 206*d* instead of sinewave generator 106*d* of sinewave generating unit 106.

Sinewave generator 206*d* includes phase calculator 106*a*, address calculator 106*b*, memory section 106*c*, and waveform generator 306*d*.

Phase calculator 106*a* calculates phase φ2 from phase φ1 based on frequency-multiplied clock CKx obtained from frequency multiplier 102. Phase calculator 106*a* obtains, from memory 110, correction amount Ad corresponding to temperature data Td supplied from temperature sensor 107, and then, converts phase φ1 based on correction amount Ad into phase φ2 to calculate phase φ2. Phase calculator 106*a* then outputs phase φ2 to address calculator 106*b*.

Address calculator 106*b* stores addresses corresponding to phases. Table 1 shows values of the phase stored in address calculator 106*b* and addresses corresponding to the values of the phase.

TABLE 1

| Phase (rad) | Address |
|---|---|
| 0.000 | 0 |
| 0.025 | 1 |
| 0.049 | 2 |
| 0.074 | 3 |
| 0.098 | 4 |
| 0.123 | 5 |
| 0.147 | 6 |
| ... | ... |

Address calculator 106*b* selects an address corresponding to phase φ2 supplied from phase calculator 106*a*, and outputs the selected address to memory section 106*c*. To be more specific, address calculator 106*b* selects address ad1 and address ad2 from the values of the phase shown in table 1, and outputs the addresses to memory section 106*c*. Address ad1 corresponds to the value closest to phase φ2 among values smaller than phase φ2. Address ad2 corresponds to the value closest to phase φ2 among values larger than phase φ2. For instance, when phase calculator 106*a* calculates phase φ2 as 0.06 (rad), address calculator 106*b* selects address "2" that is closest to 0.06 (rad) among values shown in Table 1 smaller than 0.06 (rad), and address "3" that is closest to 0.06 (rad) among values shown in Table 1 larger than 0.06 (rad), and then, outputs the selected addresses to memory section 106*c*.

When address calculator 106*b* outputs addresses ad1 and ad2 to memory section 106*c*, address calculator 106*b* outputs address ad0 corresponding to phase φ2 to waveform generator 306*d*. To be more specific, as shown in Table 1, addresses are in proportion to phases, namely, a linear relation between the phase and the address allows calculating address ad0 corresponding to phase φ2 by using equation (2) below:

$$ad0 = \phi2 \times \frac{1}{Ph}. \quad (2)$$

Phase step Ph is a phase increment from a phase corresponding to an address to a phase corresponding to the next phase.

Phase step Ph which is a phase increment with respect to the addresses shown in Table 1 is 2π/256. Accordingly, in the case that phase φ2 is 0.06 (rad), address ad0 is calculated as:

$$ad0 = 0.06 \times (256/2\pi) = 2.4446.$$

Memory section 106*c* stores address values and data of amplitude corresponding to the address values. Table 2 shows the address values and data corresponding to the address values stored in memory section 106*c*.

TABLE 2

| Address | Data |
|---|---|
| 0 | 0.000 |
| 1 | 0.025 |
| 2 | 0.049 |
| 3 | 0.074 |
| 4 | 0.098 |
| 5 | 0.122 |
| 6 | 0.147 |
| ... | ... |

Memory section 106*c* outputs, to waveform generator 306*d*, data1 and data2 corresponding to addresses ad1 and ad2 supplied from address calculator 106*b*. For instance, upon having selected address '2' and '3' input, memory section 106*c* outputs data "0.049" corresponding to address "2" and data "0.074" corresponding to address "3" to waveform generator 306*d*.

Based on addresses ad1, ad1, and ad2 supplied from address calculator 106*b* and data1, and data2 supplied from memory section 106*c*, waveform generator 306*d* can calculate detecting signal Ddet which forms a sinewave by using equation (3):

$$Ddet = data1 + (ad0 - ad1) \times (data2 - data1) \quad (3).$$

Multiplier 115 multiplies digital sensor signal Dsnc by detecting signal Ddet. Digital sensor signal Ssnc is supplied from analog-digital converter 105 while signal Ddet is produced by sinewave generating unit 106 (206). This multiplication detects a physical quantity signal corresponding to the physical quantity detected by physical-quantity sensor element 10.

Digital filter 120 passes only a low-frequency component of the physical quantity signal detected by multiplier 115 for removing noises. The low-frequency component passes through digital filter 120 as digital detection signal Dphy.

The structure discussed above allows a sinewave signal having any phase to be calculated, so that the phase of a detection signal can be adjusted accurately by calculation without increasing a clock frequency. This accurate phase adjustment has not been achieved through an adjustment of the detecting signal or a physical quantity signal in a real-time direction. This adjustment method relies on an analog quantity or a clock signal. On the other hand, an environmental parameter, such as temperature, can be included in the phase calculation, and use of a sinewave signal having a phase properly adjusted as a detection signal, which is multiplied by a signal to be detected, allows performing detection. Accurate and inexpensive physical-quantity sensor 1 is thus obtainable without increasing power consumption and a circuit size.

The signal processing circuit disclosed in PTL 1 requires a phase adjustment between a digital sensor signal and a digital sinewave signal in minimum quantities of data of the digital sensor signal in order to process accurately the data (digital value) obtained by an analog-digital conversion circuit. In other words, a resolution (minimum quantity) of phase adjustment cannot be finer than a sampling period of an analog-digital conversion circuit, so that the sampling frequency of the analog-digital conversion circuit is raised in order to improve the accuracy of the phase adjustment. However, the higher sampling frequency invites a larger circuit size and larger power consumption.

The shape of physical-quantity sensor element 10 according to the embodiment is not limited to a tuning-fork shape, but it can be another shape, such as a circular column shape, a regular triangle column shape, a regular quadrangle column shape, or an annular shape.

Figure 5:
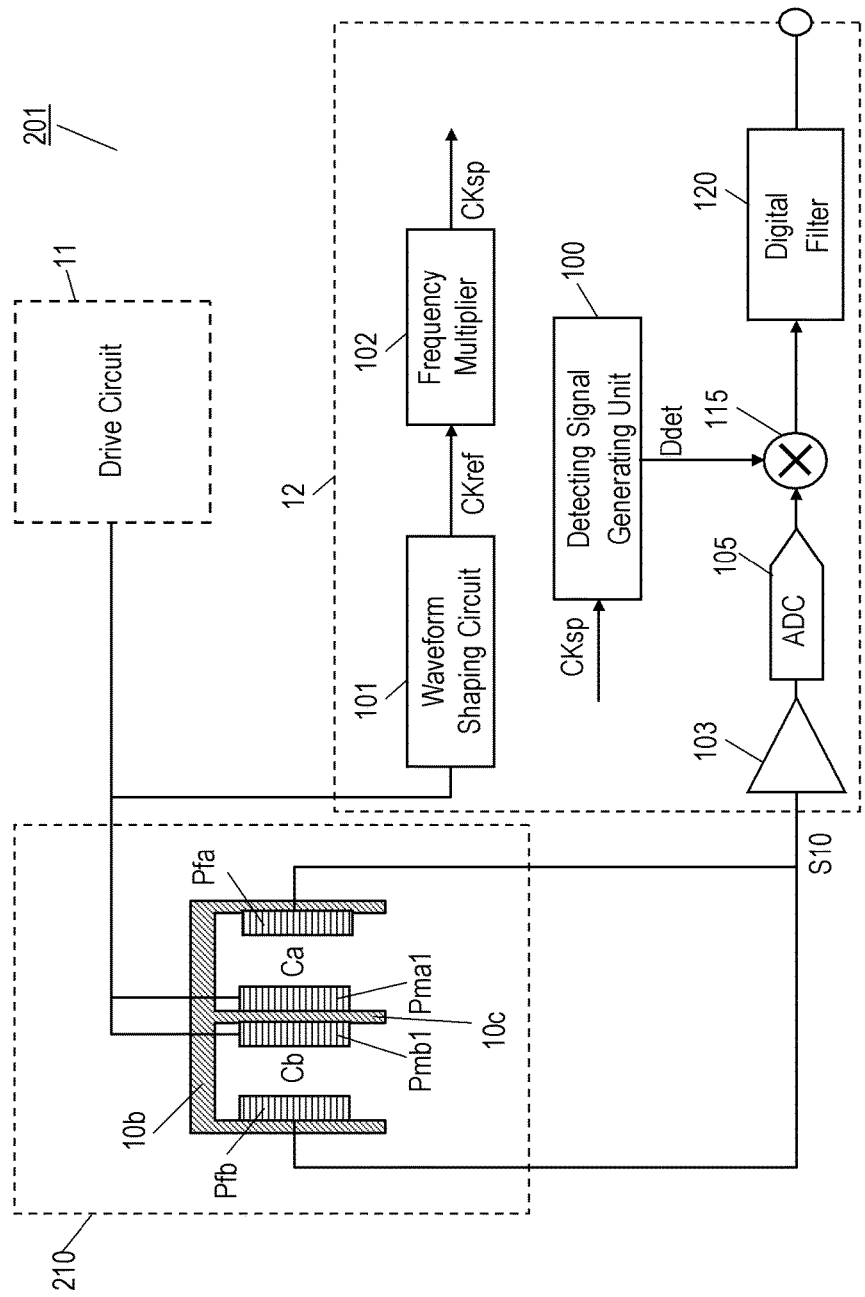
FIG. 5 is a block diagram of another physical-quantity sensor in accordance with the embodiment.

FIG. 5 is a block diagram of another physical-quantity sensor 201 in accordance with the embodiment. In FIG. 5, components identical to those of physical-quantity sensor 1 shown in FIGS. 1 and 2 are denoted by the same reference numerals. Physical-quantity sensor 201 includes physical-quantity sensor element 210 instead of sensor element 10 of physical-quantity sensor 1 shown in FIGS. 1 and 2. Physical-quantity sensor element 210 is an acceleration sensor of capacitive type, and includes fixed section 10b, movable section 10c, movable electrodes Pma1 and Pmb1, detection electrode Pfa and Pfb, and a differential amplifier. Movable section 10c is connected to fixed section 10b as to move in response to an acceleration. Movable electrodes Pma1 and Pmb1 are disposed on movable section 10c. Detection electrodes Pfa and Pfb are disposed on fixed section 10b to face movable electrode Pma1 and Pmb1, respectively. Movable electrode Pma1 and detection electrode Pfa which face each other constitute capacitive element Ca. Movable electrode Pmb1 and detection electrode Pfb which face each other constitute capacitive element Cb. Capacitive elements Ca and Cb receive drive signal Sdrv from drive circuit 11. The differential amplifier outputs sensor signal S10 that corresponds to a difference between electric charges produced on detection electrodes Pfa and Pfb. An acceleration applied to physical-quantity sensor element 210 displaces movable section 10c, thereby increasing the capacitance of one of capacitive elements Ca and Cb and decreases the capacitance of another of capacitive elements Ca and Cb. This operation produces a difference between electric charges produced on detection electrodes Pfa and Pfb, and outputs sensor signal S10 corresponding to the difference.

Figure 6:
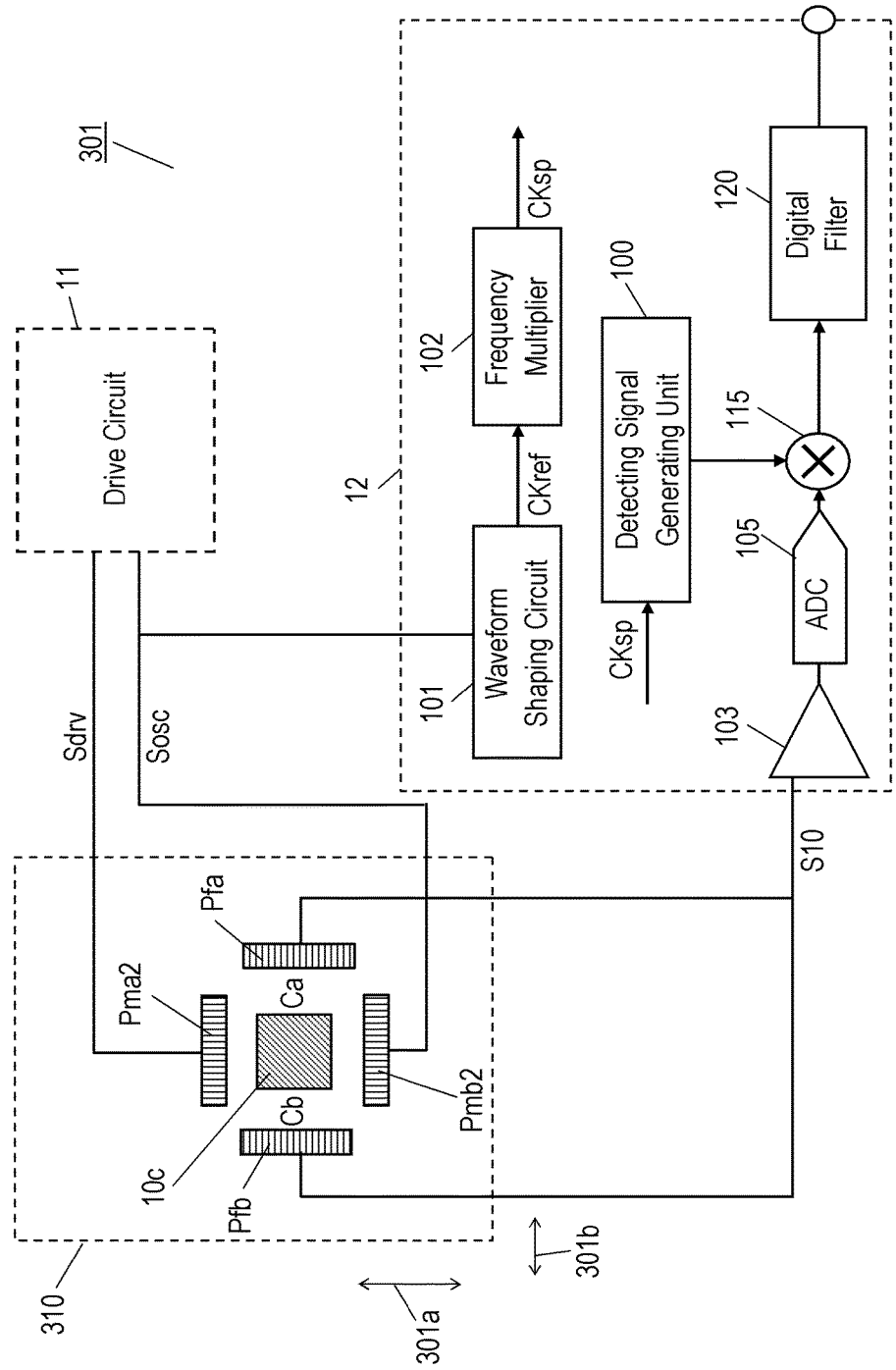
FIG. 6 is a block diagram of still another physical-quantity sensor in accordance with the embodiment.

FIG. 6 is a block diagram of still another physical-quantity sensor 301 in accordance with the embodiment. In FIG. 6, components identical to those of physical-quantity sensor 1 shown in FIGS. 1 and 2 are denoted by the same reference numerals. Physical-quantity sensor 301 includes physical-quantity sensor element 310 instead of sensor element 10 of physical-quantity sensor 1 shown in FIGS. 1 and 2. Sensor element 310 is an angular velocity sensor of capacitive type, and includes movable section 10c, drive electrodes Pma2 and Pmb2, and detection electrode Pfa and Pfb. Movable section 10c and drive electrodes Pma2 and Pmb2 are disposed along direction 301a such that movable section 10c is placed between drive electrodes Pma2 and Pmb2. Movable section 10c and detection electrodes Pfa and Pfb are disposed along direction 301b crossing direction 301a perpendicularly such that movable section 10c is placed between detection electrodes Pfa and Pfb. Detection electrode Pfa and movable section 10c constitute capacitive element Ca having a capacitance while detection electrode Pfb and movable section 10c constitute capacitive element Cb having a capacitance. Drive signal Sdrv supplied from drive circuit 11 causes movable section 10c to perform drive vibration along direction 301a. While movable section 10c vibrates, a rotating motion is applied to physical-quantity sensor element 310 for movable section 10c to perform detect-vibration along direction 301b in response to a Coriolis force caused by the rotating motion. This detect-vibration increases the capacitance of one of capacitive elements Ca and Cb and decreases the capacitance of another of capacitive elements Ca and Cb. This operation produces a difference between electric charges produced on detection electrodes Pfa and Pfb, so that sensor signal S10 corresponding to this difference is output.

Figure 7:
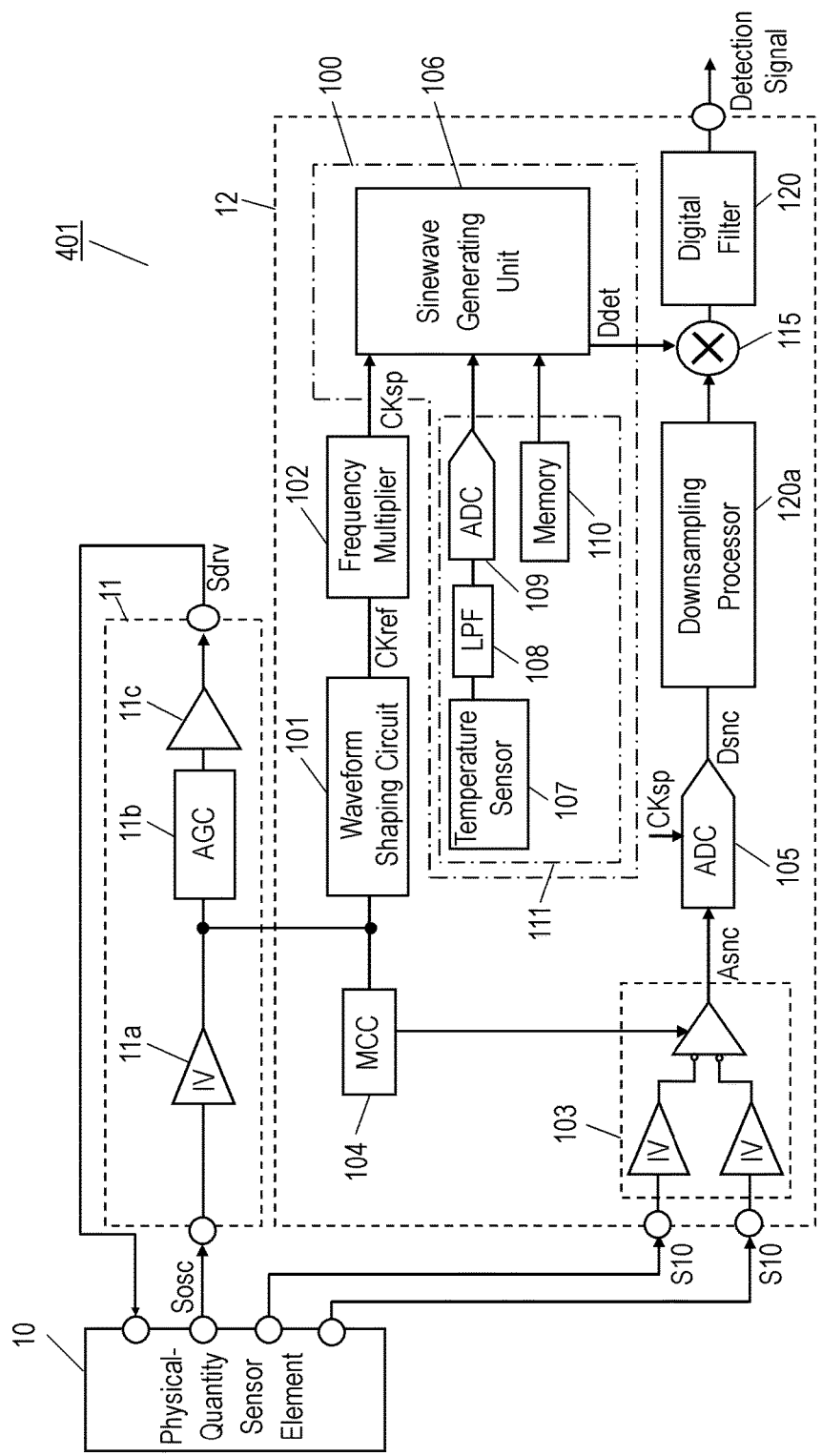
FIG. 7 is a block diagram of a further physical-quantity sensor in accordance with the embodiment.

FIG. 7 is a block diagram of further physical-quantity sensor 401 in accordance with the embodiment. In FIG. 7, components identical to those of physical-quantity sensor 1 shown in FIG. 1 are denoted by the same reference numerals. Physical-quantity sensor 401 includes downsampling processor 120a provided at a latter stage of analog-digital converter 105. Downsampling processor 120a includes a decimation filter, and reduces a sampling frequency of digital sensor signal Dsnc by decimating digital values from digital sensor signal Dsnc, thereby reducing a sampling frequency of digital detection signal Dphy to be supplied to digital filter 120. As a result, a circuit size and a power consumption of digital filter 120 can be reduced.

Figure 8:
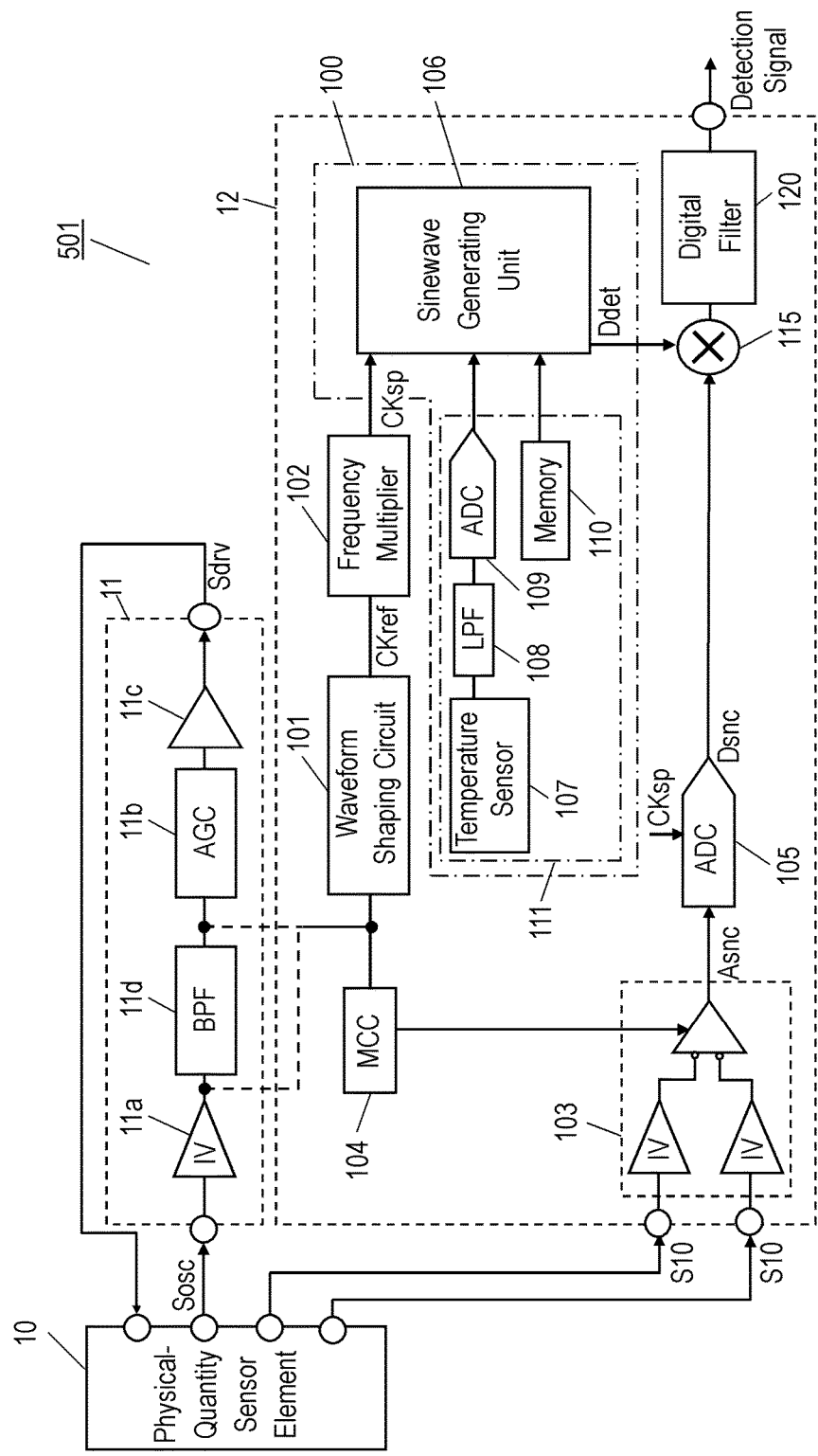
FIG. 8 is a block diagram of a further physical-quantity sensor in accordance with the embodiment.

FIG. 8 is a block diagram of further physical-quantity sensor 501 in accordance with the embodiment. In FIG. 8, components identical to those of physical-quantity sensor 1 shown in FIG. 1 are denoted by the same reference numerals. Drive circuit 11 of sensor 501 includes bandpass filter (BPF) 11d provided between monitor amplifier 11a and AGC 11b. Drive signal Sdrv supplied to waveform shaping circuit 101 can be obtained from an earlier stage of BPF 11d, or from a latter stage.

Figure 9:
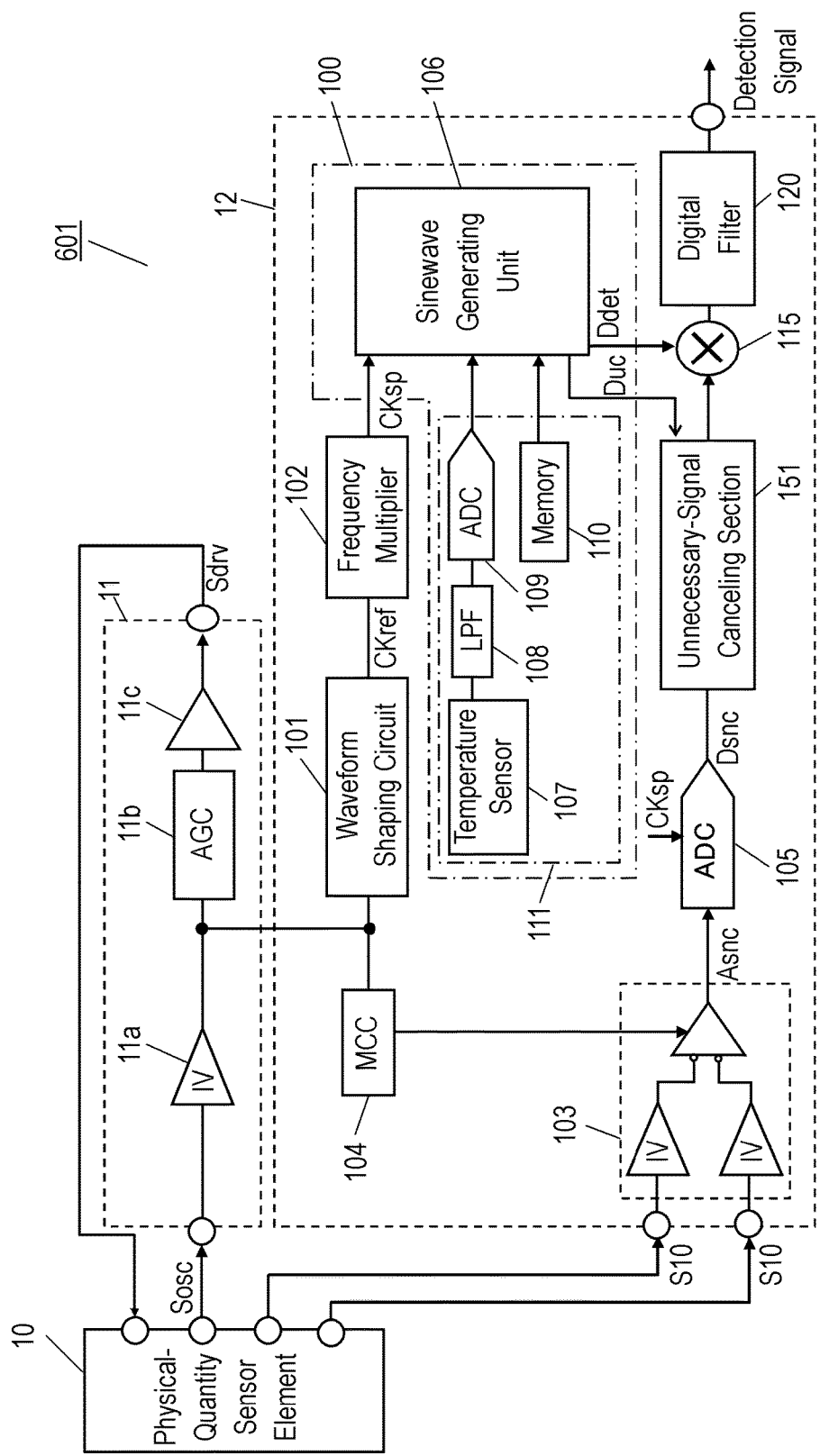
FIG. 9 is a block diagram of a further physical-quantity sensor in accordance with the embodiment.

FIG. 9 is a block diagram of further physical-quantity sensor 601 in accordance with the embodiment. In FIG. 9, components identical to those of physical-quantity sensor 1 shown in FIG. 1 are denoted by the same reference numerals. As discussed above, although MCC 104 reduces unnecessary signals contained in analog sensor signal Asnc, a part of the unnecessary signals may remain in analog sensor signal Asnc. In this case, digital sensor signal Dsnc contains the remaining unnecessary signals. Physical-quantity sensor 601 shown in FIG. 9 reduces the unnecessary signals contained in signal Dsnc. Sensor 601 includes unnecessary-signal canceling section 151 provided between ADC 105 and multiplier 115. Based on oscillating signal Sosc, which is a predetermined signal, sinewave generating unit 106 of signal generating unit 100 generates digital canceling signal Duc, and unnecessary-signal canceling section 151 adds digital canceling signal Duc to digital sensor signal Dsnc, thereby canceling at least a part of the unnecessary signals contained in digital sensor signal Dsnc for reducing the unnecessary signals.

Sinewave generating unit 106 generates detecting signal Ddet supplied to multiplier 115, as digital canceling signal Duc, or generates signal Duc by shifting a phase of detecting signal Ddet.

Figure 10:
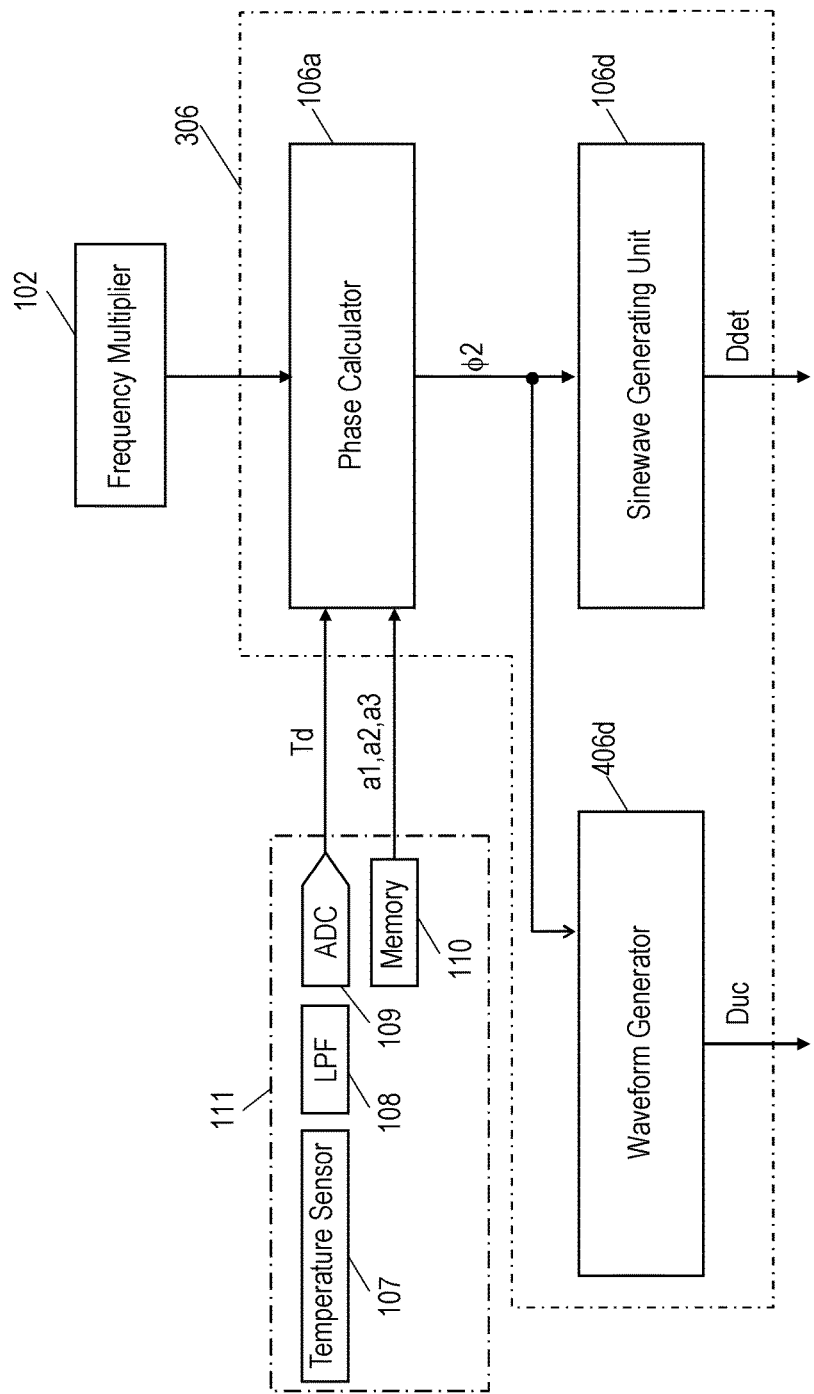
FIG. 10 is a block diagram of a sinewave generating unit of the physical-quantity sensor shown in FIG. 9.

FIG. 10 is a block diagram of sinewave generating unit 306 of physical-quantity sensor 601 shown in FIG. 9. In FIG. 10, components identical to those of sinewave generating unit 106 (206) shown in FIG. 3 (FIG. 4) are denoted by the same reference numerals. Sinewave generating unit 306 includes waveform generator 406d in addition to the structural elements of sinewave generating unit 106 (206) shown in FIG. 3 (FIG. 4). Waveform generator 406d generates digital canceling signal Duc based on phase φ2 supplied from phase calculator 106a, and outputs digital canceling signal Duc to multiplier 115. Sinewave generating unit 306 can change the waveform of digital canceling signal Duc to a different one from the sinewave of detecting signal Ddet in phase, frequency, and waveform, so that the unnecessary signals contained in digital sensor signal Dsnc supplied from ADC 105 can be reduced more effectively.

Figure 11:
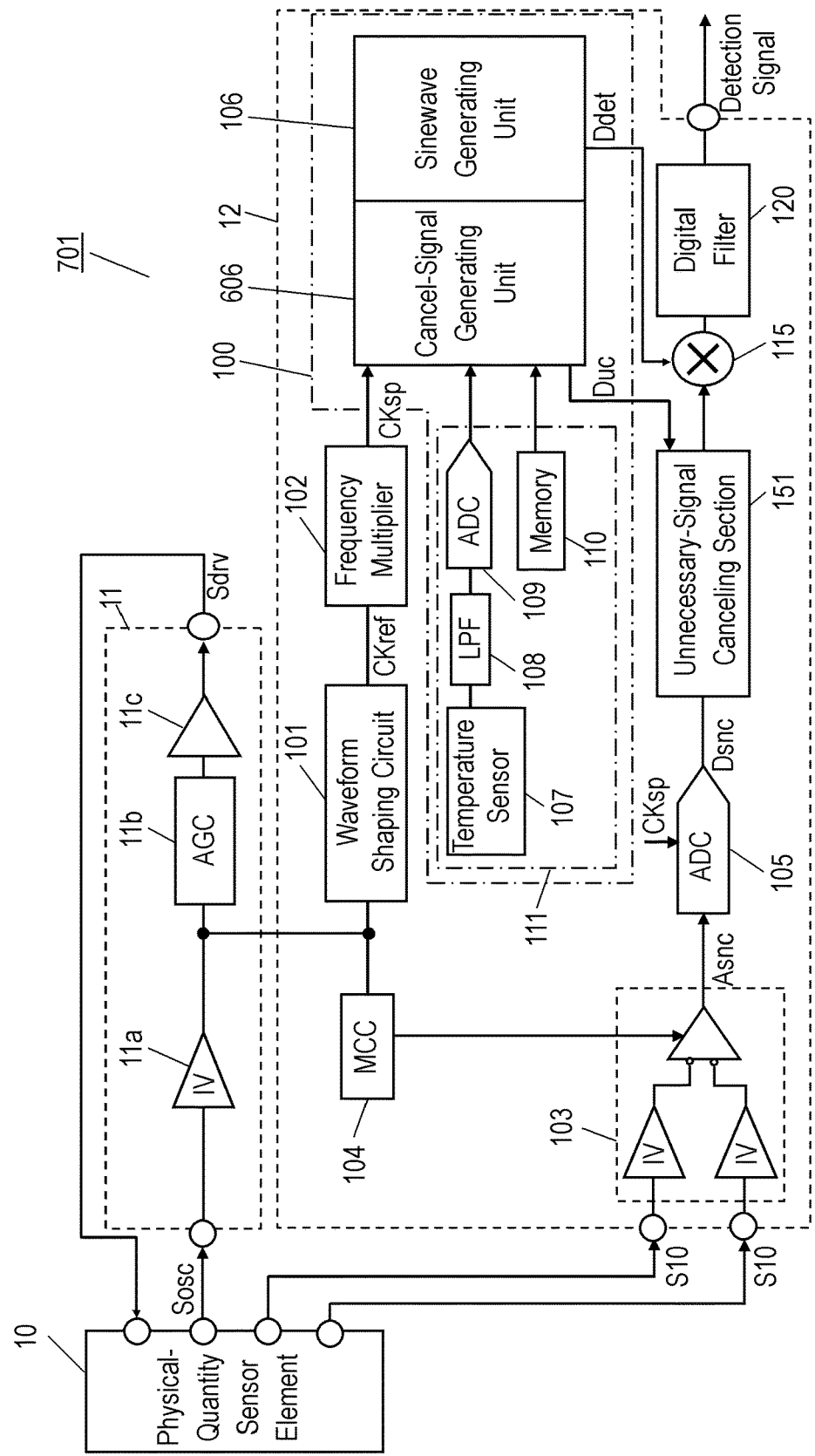
FIG. 11 is a block diagram of a further physical-quantity sensor in accordance with the embodiment.

FIG. 11 is a block diagram of further physical-quantity sensor 701. In FIG. 11, components identical to those of physical-quantity sensor 601 shown in FIG. 9 are denoted by the same reference numerals. Physical-quantity sensor 701 further includes cancel-signal generating unit 606 that generates digital canceling signal Duc based on temperature data Td and a correction coefficient supplied from correction-amount generator 111. The correction coefficient supplied to cancel-signal generating unit 606 can be different from correction coefficients a1, a2, and a3 supplied to sinewave generating unit 106 (206). Cancel-signal generating unit 606 can make a frequency, phase, and waveform of digital canceling signal Duc different from those of detecting signal Ddet, thereby effectively reducing the unnecessary signals contained in digital sensor signal Dsnc output from ADC 105.

Figure 12:
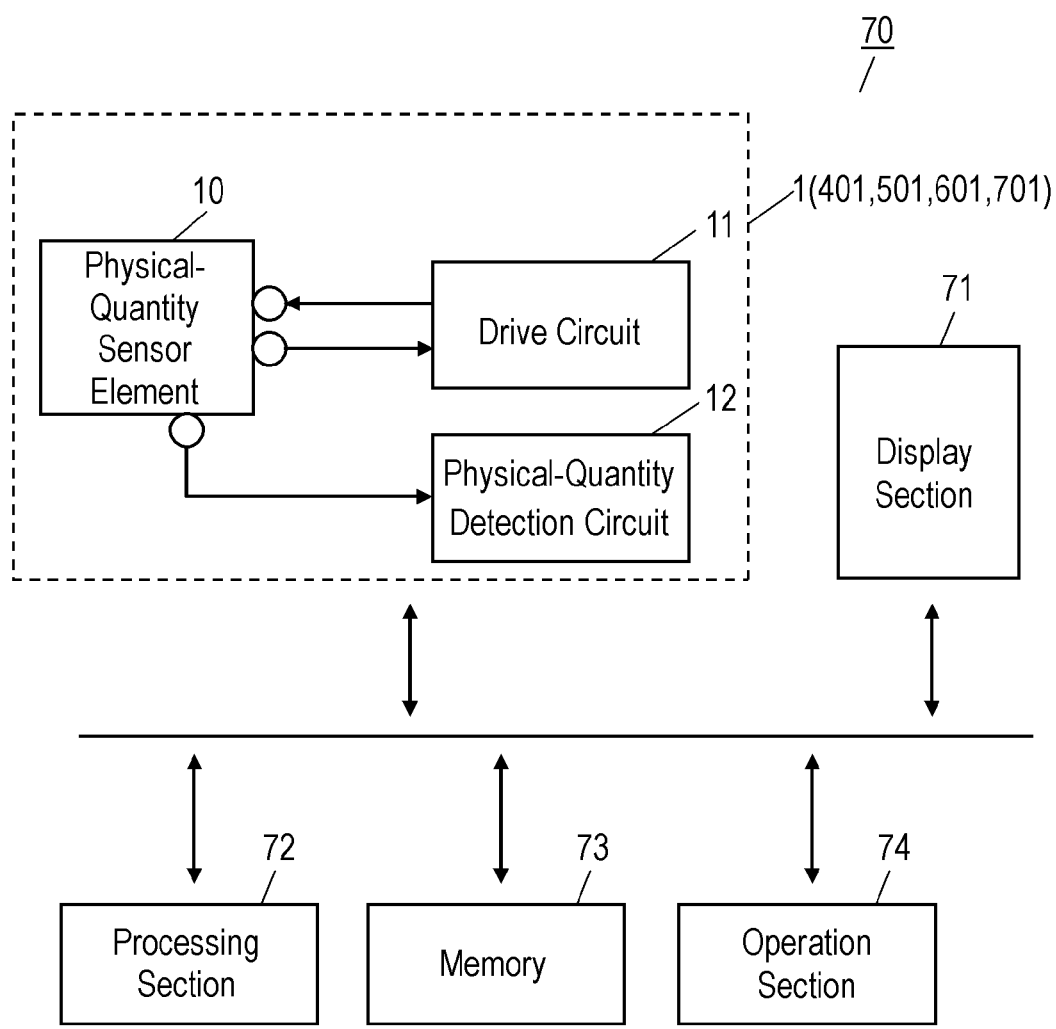
FIG. 12 is a block diagram of an electronic device having the physical-quantity sensor in accordance with the embodiment mounted thereto.
Figure 13:
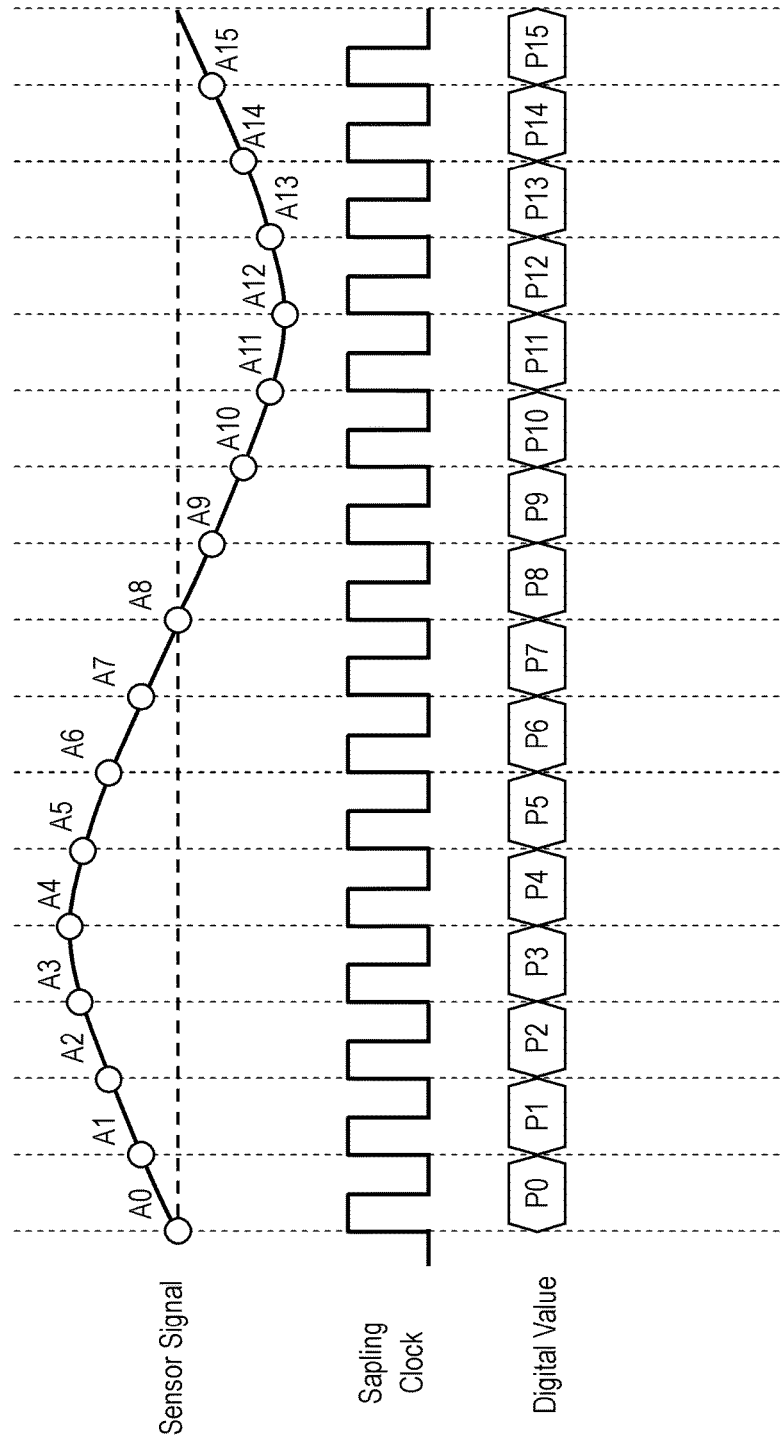
FIG. 13 illustrates a process performed by an analog-digital conversion circuit of a conventional physical-quantity sensor.

FIG. 12 is a block diagram of electronic device 70 having physical-quantity sensor 1 (401, 501, 601, or 701) in accordance with the embodiment mounted thereto. According to this embodiment, physical-quantity sensor 1 (401, 501, 601, and 701) is an angular velocity sensor. Electronic device 70 is, for instance, a digital camera, and includes physical-quantity sensor 1 (401, 501, 601, or 701), display section 71, processing section 72, such as a CPU, memory 73, and operation section 74.

Physical-quantity sensor 1 (401, 501, 601, and 701) includes physical-quantity sensor element 10, drive circuit 11, and physical-quantity detection circuit 12 as shown in FIG. 1 or other drawings. Physical-quantity sensor 1 has excellent characteristics such as a compact size, low power consumption, and high accuracy. Electronic device 70 (e.g. video camera or digital still camera) including physical-quantity sensor 1 (401, 501, 601, or 701) can have thus a small size, small power consumption, and accurately correct a camera shake.

Physical-quantity sensor 1 (401, 501, 601, and 701) in accordance with the embodiment thus improves the performance of electronic device 70, which can be not only the digital camera, but also a car navigation system, vehicle, aircraft, or robot.

INDUSTRIAL APPLICABILITY

A physical-quantity detection circuit according to the present invention can improve the accuracy of phase adjustment without increasing a sampling frequency, and is useful for a physical-quantity sensor (e.g. tuning-fork type angular velocity sensor, acceleration sensor of electrostatic type) that is used in, e.g. mobile devices, portable phones, digital cameras, and game machines.

REFERENCE MARKS IN THE DRAWINGS 1, 201, 301, 401, 501, 601 physical-quantity sensor
10 physical-quantity sensor element
11 drive circuit
12 physical-quantity detection circuit
70 electronic device
100 signal generating unit
105 analog-digital converter
106 sinewave generating unit
107 temperature detector
110 memory section
111 correction-amount generator
115 multiplier
151 unnecessary-signal cancelling section

The invention claimed is:

1. A physical-quantity detection circuit to be used with a physical-quantity sensor element that outputs a sensor signal in response to a physical quantity, the physical-quantity detection circuit comprising:
   a signal generating unit for generating a detecting signal;
   an analog-digital conversion circuit for converting the sensor signal into a digital sensor signal;
   a multiplier for multiplying the digital sensor signal by the detecting signal, and
   an unnecessary-signal cancelling section provided between the analog-digital conversion circuit and the multiplier;
   wherein the signal generating unit is configured to:
      generate a predetermined signal having a frequency corresponding to a frequency of the sensor signal;
      generate a cancelling signal based on the predetermined signal; and
      generate the detecting signal based on the predetermined signal,
   wherein the digital sensor signal contains an unnecessary signal, and
   wherein the unnecessary-signal cancelling section adds the cancelling signal to the digital sensor signal for reducing the unnecessary signal.

2. The physical-quantity detection circuit according to claim 1,
   wherein the physical-quantity sensor element outputs the sensor signal in response to the physical quantity while vibrating, and
   wherein the predetermined signal is an oscillating signal according to a vibration of the sensor element.

3. The physical-quantity detection circuit according to claim 1,
   wherein the signal generating unit converts a first phase of the predetermined signal into a second phase by calculation.

4. The physical-quantity detection circuit according to claim 1,
   wherein the signal generating unit includes a correction-amount generator and a sinewave generating unit,
   wherein the correction-amount generator includes a temperature sensor that obtains temperature data, and a memory section that stores a correction amount corresponding to the temperature data, and
   wherein the sinewave generating unit converts a first phase of the predetermined signal into a second phase based on the correction amount.

5. The physical-quantity detection circuit according to claim 1, wherein the physical quantity is an angular velocity.

* * * * *